July 19, 1960     J. D. YANDA     2,945,571

AUTOMATIC VEHICLE HAND BRAKE RELEASE

Filed March 5, 1957

INVENTOR.
JOHN D. YANDA,
BY
*Linton and Linton*
ATTORNEYS.

United States Patent Office 2,945,571
Patented July 19, 1960

2,945,571
AUTOMATIC VEHICLE HAND BRAKE RELEASE

John D. Yanda, Maple Lane, Wheeling, W. Va.

Filed Mar. 5, 1957, Ser. No. 644,099

1 Claim. (Cl. 192—4)

The present invention relates to vehicle parking brake systems and is more particularly concerned with an apparatus for the automatic release of vehicle parking brakes.

The principal object of the present invention is to provide an apparatus which will automatically release vehicle parking brakes from their brake drum clamping position whereby the driving mechanism is free to rotate for propelling the vehicle which apparatus is operable upon the starting of the vehicle engine.

A further and important object of the invention is to provide apparatus for the automatic release of a vehicle parking brake which will not release said brakes until the vehicle engine is operating and yet the apparatus can be controlled to prevent releasing said brakes while the engine is running so that the motor may be serviced with the parking brake in its set or brake drum gripping position.

A still further object of the invention is to provide an automatic parking brake releasing apparatus which may also be manually released when desired and which apparatus is mechanically operated requiring no electricity or electrical apparatus in the operation thereof.

Further objects of the invention will be in part obvious and in part pointed out in the following description of the accompanying drawings wherein, Fig. 1 is a side elevation of the present apparatus interconnected in a motor vehicle.

Figure 1:
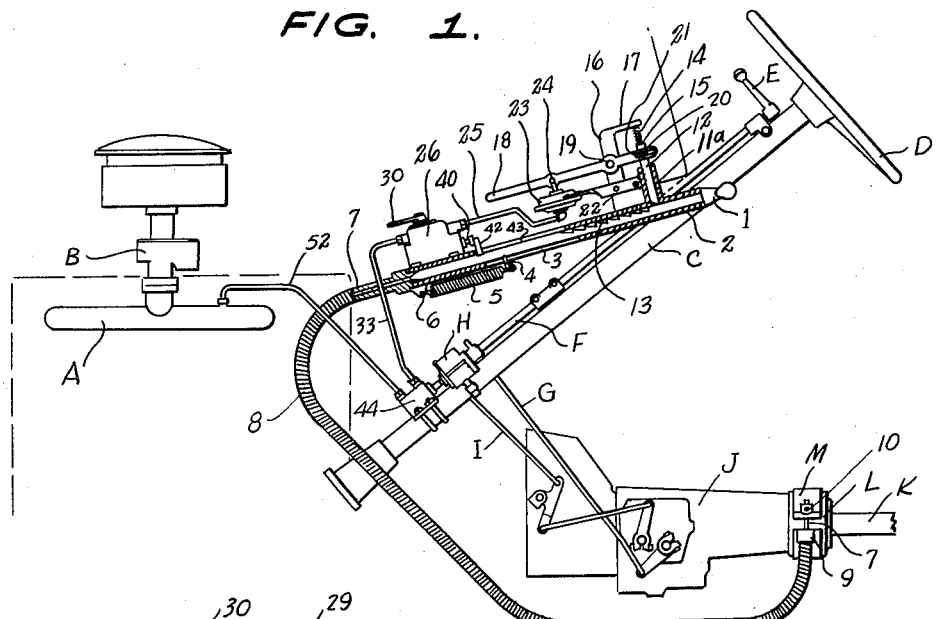

Referring now more particularly to the accompanying drawings, wherein like and corresponding parts of the present invention are designated by similar reference characters, there is shown in Fig. 1 conventional elements of a motor vehicle to which the present apparatus is applied and which elements are shown solely by way of example as other and like conventional elements can equally as well be employed. A refers to the intake manifold of the vehicle engine to which is connected the carburetor B. C indicates the vehicle steering column with D the steering wheel and E gear shift selector handle which is fixedly connected to a shaft F longitudinally slidable and pivotally mounted on said steering column. G is a link pivotally connected to said shaft, while H is the housing of a toggle to which link I is pivotally connected therethrough to said shaft. Links G and I are pivotally connected to control members of the vehicle transmission J from which extends the drive shaft K. A brake drum L is fixedly carried by said drive shaft and is surrounded by brake band M composing the brake known as a parking or emergency brake.

The apparatus forming the present invention consists of an elongated shaft 1 slidable in a tubular housing 2 fixedly connected in any manner (not shown) to the vehicle. Said housing has a slot 3 through which extends an arm 4 connected to shaft 1 and one end of a spring 5. The opposite end of said spring is connected by arm 6 to housing 2. A flexible cable 7 is fixedly connected to an end of shaft 1 and slides in a flexible tubular housing 8 connected at one end to housing 2 and at its opposite end to brake band M as at 9 while the opposite end of cable 7 is connected to the opposite end of brake band M as at 10 whereby sliding movement of shaft 1 sets and releases brake band M. Housing 2 has a tubular lateral extension 11 in which slides a pawl 11a for engaging teeth 13 of shaft 1 and tending to retain said shaft against the action of spring 5. The outer end 14 of pawl 11a is surrounded by a coil spring 15. An arm 16 mounted on said housing has a lateral extension 17 through which end 14 of said pawl can slide with spring 15 bearing against said extension.

A lever 18 is pivotally connected at 19 to arm 16 while a pin 20 on said pawl is slidable in slot 21 of said lever 18.

A support 22 connected to arm 16 has a vacuum operated member 23 connected thereto with the control rod 24 of said member being pivotally connected to lever 18. A tube 25 is fixedly connected to member 23 and in communication with the interior thereof.

The opposite end of tube 25 is fixedly connected to a control valve 26 which contains rotary plug 27 having a lateral passageway 28 formed in the bottom thereof with a control rod 29 to which is fixedly connected lever 30. A plate 31 has said rod 29 extending therethrough and is fixedly connected to housing 26 for closing plug 27 therein. Valve housing 26 has a passageway 32 in communication with plug recess 28 and also in communication with a tube 33 fixedly connected to said housing.

Valve housing 26 further has a passageway 34 in communication with tube 25 and also in communication with a bore 35 provided in said housing. A piston 36 is slidably mounted in said bore against a spring 37 while said bore 35 has a longitudinal recess 38 beneath passageways 28 and 34. The plug 39 is fixedly connected to said housing closing said bore and has the piston rod 40 slidably extending therethrough. The outer end of said piston rod has a head 41 capable of being contacted by a finger 42 extending through slot 43 in housing 2 and fixedly connected to brake application shaft 1 so that the piston of control valve 26 is displaced when the brakes are applied.

Figure 3:
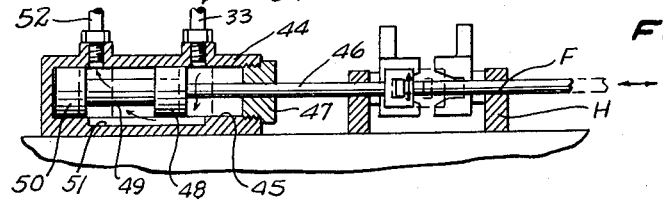
Fig. 3 is a cross sectional view of a gear shift selector lever control valve in one position thereof.
Figure 4:
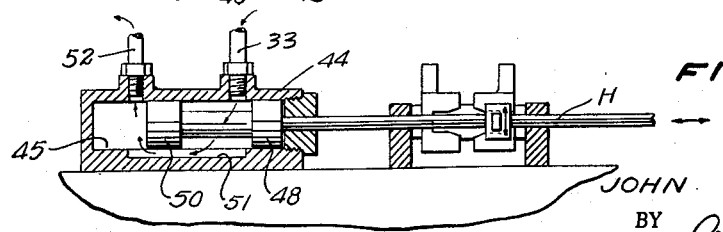
Fig. 4 is similar to Fig. 3 but with the valve in a second position thereof.

A second valve housing 44 as best shown in Figs. 3 and 4 of the drawings is of a cylindrical configuration having a bore 45 with a piston rod 46 slidably extending through plug 47 closing said bore with piston 48 slidable in said bore and connected to said piston rod. An extension 49 connects piston 48 to a second piston 50 is also slidable in said bore. A longitudinal recess 51 is provided in the side wall of said bore beneath tube 52 and tube 33 both connected to said valve housing 44 and in communication with bore 45. Tube 52 is connected to intake manifold A.

In the operation of the present apparatus, lever 1 is pulled longitudinally and outwardly of housing 2 extending spring 5 and drawing cable 7 into said housing with the result that cable 7 draws brake band M tightly around drum L braking shaft K. Pawl 11a will engage teeth 13 retaining the shaft 1 in the position to which it is drawn.

When the operator starts the engine in normal manner, a vacuum is created in manifold A which in turn creates a vacuum through tube 52, valve 44, tube 33, valve 26, tube 25 and the vacuum control member 23 whereby arm 24 is drawn inwardly of said control member pulling lever 18 therewith with the result that said lever pivots at 19 and pin 21 is pulled upwardly drawing pawl 11a from teeth 13 releasing shaft 1. Said shaft is pulled inwardly of housing 2 by spring 5 whereby cable 7 permits brake band M to expand releasing drive shaft K.

Figure 2:
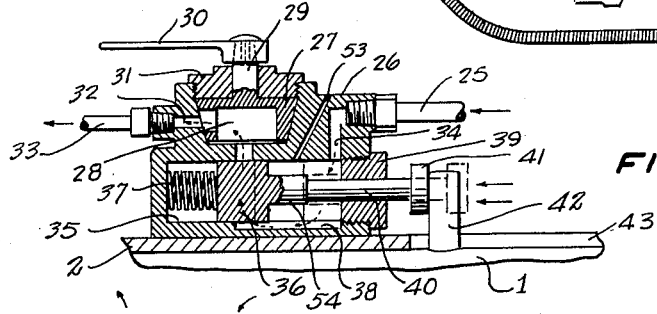
Fig. 2 is a cross sectional view of a control valve forming part of the present apparatus.

Upon brake application shaft 1 moving inwardly of housing 2, finger 42 carried thereby engages piston head 41 of control valve 26 and pushes piston 36 to the position shown in Fig. 2 of the drawings shutting off recess 28 from bore 35 thus disconnecting manifold A from vacuum control member 23. Thus the continued operation of the engine will not effect the member 23.

Should it be desired to operate the engine with the vehicle standing still and the parking brake set, lever 30 can be displaced to turn plug 27 disconnecting tube 33 from bore 35 and thus preventing the operation of vacuum control member 23.

Gear shift selector rod F is given both a longitudinal and pivotal motion by lever E in order to place transmission J in the drive gears or in neutral. Longitudinal movement of rod F moves the pistons 48 and 50 of second valve unit 44 and when said rod F is moved downwardly, the pistons are moved to the position shown in Fig. 3 and when the rod is moved upwardly, pistons are moved to the position of Fig. 4 thus permitting the vacuum in manifold A to act through tube 52, bore 45, recess 51 and tube 33 from either position as shown. However, when the lever E is moved to position the transmission out of gear, that is in neutral, the position of rod F is such that pistons 48 and 50 close communication between bore 45 and tubes 33 and 52 respectively thus permitting the continuous running of the engine without the vacuum effecting member 23 and permitting the brake to be maintained set in the braking position.

Should it be desired to release the brakes when the vehicle motor will not start, manual pressure on lever 18 which is conveniently positioned beneath the vehicle dashboard, will release the brakes.

Sliding of piston 36 of control valve 26 by finger 42 attached to shaft 1 to the position shown in Fig. 2 compresses spring 37 and also opens port 53 of control valve 26 and to bore 35 and the atmosphere admits air to passageway 34, pipe 25 and member 23 for filling the vacuum in said member whereby lever 18 is released and spring 15 tends to move pawl 11a against shaft 1. Drawing said shaft 1 for setting the brakes causes spring 37 to push piston 36 of control valve 26 towards plug 39 until shoulder 54 engages said plug. Thereby port 53 is closed by said piston, but recess 28 and passageway 34 open to said bore.

The vacuum control member 23 can be of any conventional type such as a cylinder with slidable piston connected to lever 18 or a closed casing with flexible diaphragm therein which is bent downwardly by the vacuum and operates a rod connected to said lever. Other forms of vacuum operated members may equally as well be employed.

The present invention is applicable to use with the various types of so-called parking or safety brakes as conventionally used in vehicles whether the brake is applied to the drive shafts, transmission or directly to the wheels as the apparatus is primarily concerned with controlling the movement of the cable link or lever for setting or releasing the brakes employed in temporarily maintaining the vehicle in a non-movable condition other than through the use of the vehicle wheel braking system.

The present invention is capable of considerable modification and such changes thereto as come within the scope of the appended claim are deemed to be a part of the present invention.

What I claim is:

In apparatus for the automatic release of a parking brake on an automotive vehicle, a gear shift selector, an engine having an intake manifold, a brake control shaft, means for urging said control shaft into brake release position, locking means for locking said shaft in brake applying position, pneumatic diaphragm means having an operated piston rod connected to operate said locking means, a first control valve mounted and arranged for operation by displacements of said shaft, a second control valve mounted and arranged for operation by displacement of said gear shift selector, a first pipe connecting said manifold to an inlet of said second valve, a second pipe connecting the outlet of said second valve to the inlet of said first valve, a third pipe connecting the outlet of said first valve to said diaphragm means, the apparatus being so constructed and arranged that when said brake is applied and said gear shift selector is in gear, said first and second valves are open and provide an open path from said manifold to said diaphragm means, and when said brake has been released said first valve is in closed position and blocks the path between said manifold and said diaphragm means.

References Cited in the file of this patent

UNITED STATES PATENTS

| | | |
|---|---|---|
| 2,725,128 | Martin | Nov. 29, 1955 |
| 2,781,117 | McLeod | Feb. 12, 1957 |